United States Patent [19]

Kurelek

[11] Patent Number: 4,491,163
[45] Date of Patent: Jan. 1, 1985

[54] METHOD AND APPARATUS FOR FELLING TREES

[75] Inventor: John Kurelek, Brantford, Canada

[73] Assignee: Koehring Canada Limited, Brantford, Canada

[21] Appl. No.: 343,359

[22] Filed: Jan. 27, 1982

[30] Foreign Application Priority Data

Aug. 5, 1981 [CA] Canada .................................. 383217

[51] Int. Cl.³ .......................................... A01G 23/08
[52] U.S. Cl. .................... 144/336; 144/3 D; 144/34 R; 144/2 Z
[58] Field of Search ............ 144/2 Z, 3 D, 34 R, 144/34 A, 336; 83/928; 30/379.5

[56] References Cited

U.S. PATENT DOCUMENTS

| 2,542,952 | 2/1951 | White | 144/34 R |
| 3,343,575 | 7/1965 | Trout | 144/34 R |
| 3,542,099 | 11/1970 | Gibson | 144/3 D |
| 3,672,412 | 6/1972 | Albright | 144/3 D |
| 3,915,209 | 10/1975 | Denis | 144/3 D |
| 4,161,200 | 7/1979 | Albright | 144/34 R |
| 4,269,241 | 5/1981 | Hickman | 30/379.5 |
| 4,270,586 | 6/1981 | Hyde et al. | 144/34 R |
| 4,326,570 | 4/1982 | Fridley et al. | 144/34 R |

FOREIGN PATENT DOCUMENTS 1065742 11/1979 Canada .......................... 144/34 E Primary Examiner—Francis S. Husar
Assistant Examiner—Jorji M. Griffin
Attorney, Agent, or Firm—Sim & McBurney

[57] ABSTRACT

There is provided a felling head for attachment to a boom. The felling head includes an upper part and a lower part. The upper part has at least one brace portion and a grapple adapted to clasp a tree trunk against the brace portion. The lower part includes a circular saw blade mounted in a plane perpendicular to the longitudinal axis of a tree clasped between the brace portion and the grapple. The leading edge of the circular saw blade projects beyond the location of the brace portion by a distance at least as great as the diameter of a tree being felled so that such tree can be cut through by the saw blade before the tree comes into contact with any other part of the felling head, including the brace portion.

7 Claims, 4 Drawing Figures

METHOD AND APPARATUS FOR FELLING TREES

This invention relates generally to the tree-harvesting industry, and has particularly to do with the design of a tree harvester, specifically a boom-mounted felling head for a tree harvester, which permits a high harvesting rate at a relatively low vehicle speed.

BACKGROUND OF THIS INVENTION

In the forestry, lumber and pulp and paper industry, it is common at present to fell trees one tree at a time. There are varying methods of collecting the trees into bunches and of loading the trees for subsequent transport or processing, and generally the yield is from two to six trees per minute.

There have been some attempts to apply to tree felling the idea of a continuously travelling and collecting machine, similar to a combine or forage harvester used in agriculture. A first thought along this line might be to provide a machine with a full width tree cutting sickle bar, and a gathering and carrying mechanism. However, this has apparently not been attempted due to the variability of terrain and the difficulty of manoeuvring such a wide-width machine. Instead, there have been attempts to exploit the continuous felling pinciple by bringing the swath width down to a manageable size. By decreasing the swath width, one must increase the speed of the machine in order to keep the yield acceptably high. Reference may be had here to Canadian Pat. No. 1,029,283, granted on Apr. 11, 1978, Hyde and Tyndall, and U.S. Pat. No. 3,659,635, granted on May 2, 1972, Mellgren. The approach in the latter patent is to mount a circular cutting saw blade in a horizontal plane adjacent the machine, and to run the machine forward as the circular saw blade cuts a swath adjacent the path followed by the machine. The circular saw blade is mounted to pass closely over the surface of the ground, thereby cutting the trees off as close to the roots as possible.

This narrow swath/high speed approach to continuous tree felling has been limited to exceptionally good terrain, and for most applications it is therefore desirable to return to the concept of a wide swath, such as can be attained by the use of a boom. Unlike conventional shear or saw heads, however, such a boom should have means which permit continuous tree felling, and multiple tree accumulation if the trees are of small enough diameter, while the harvesting machine travels at a low speed through the forest. This would result in low miles per hour, low cost per mile, low miles per acre, and low cost per acre.

GENERAL DESCRIPTION OF THIS INVENTION

In essence, the present invention provides a solution to the foregoing problem by mounting a felling head on a boom, and using a horizontal-plane circular saw at the bottom of the felling head to cut through trees. In the upper part of the felling head is located a tree grappling or grasping means, and these two functional portions are so arranged with respect to each other that a tree of typical size can be cut through by the saw blade before the tree is grasped by the upper portion of the felling head. This has the considerable advantage of placing no incidental bending stress on the tree trunk prior to completion of the saw cut. It is well known that any attempt to cut through a tree trunk with a blade while the tree trunk is under even slight beam bending moments (as from grasping or pushing) may result in splintering, and for solid product use, the splintered portion of the tree must be scrapped. This significantly reduces the yield from the particular tree.

In the preferred operation, the boom swing is combined with slow machine travel to direct and feed the saw through each tree. In more complex tree stands and terrain, boom extension and height control can also be employed.

One advantage of this approach lies in the fact that a saw is more efficient than a shear device for cutting trees, in that it requires lower forces (less energy expended), and can generally be made of lower weight for a given tree size and hardness. The present invention contemplates feeding the saw using existing controls, and therefore does not require additional feed cylinders, guides, linkages or controls.

More particularly this invention provides a felling head for attachment to a boom. The felling head includes an upper part and a lower part, with the upper part including at least one brace portion adapted to contact a tree being felled, along with tree grappling means adapted to clasp a tree trunk against the brace portion. The lower part has a circular saw blade mounted thereon in a plane perpendicular to the longitudinal extent of a tree clasped between the brace portion and the grappling means, the axis of the saw blade being fixed with respect to the upper and lower part. The circular saw blade has its leading edge projecting beyond the location of the brace portion by a distance as least as great as the diameter of a tree being felled so that such tree must be cut through by the saw blade before the tree can come into contact with any other part of the felling head, including the brace portion, whereby no undue bending or shear forces are applied to the tree during the cutting of the tree.

This invention further provides a method of felling a tree, including the following steps: the tree is cut through with a circular saw oriented in a plane substantially perpendicular to the axis of the tree, and then, substantially immediately after the tree has been completely cut through, but before the part of the tree above the cut has been significantly displaced in translation or angulation from its position prior to being cut, clasping the tree above the cut by the use of a grapple means adapted to set the tree down in a desired location.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
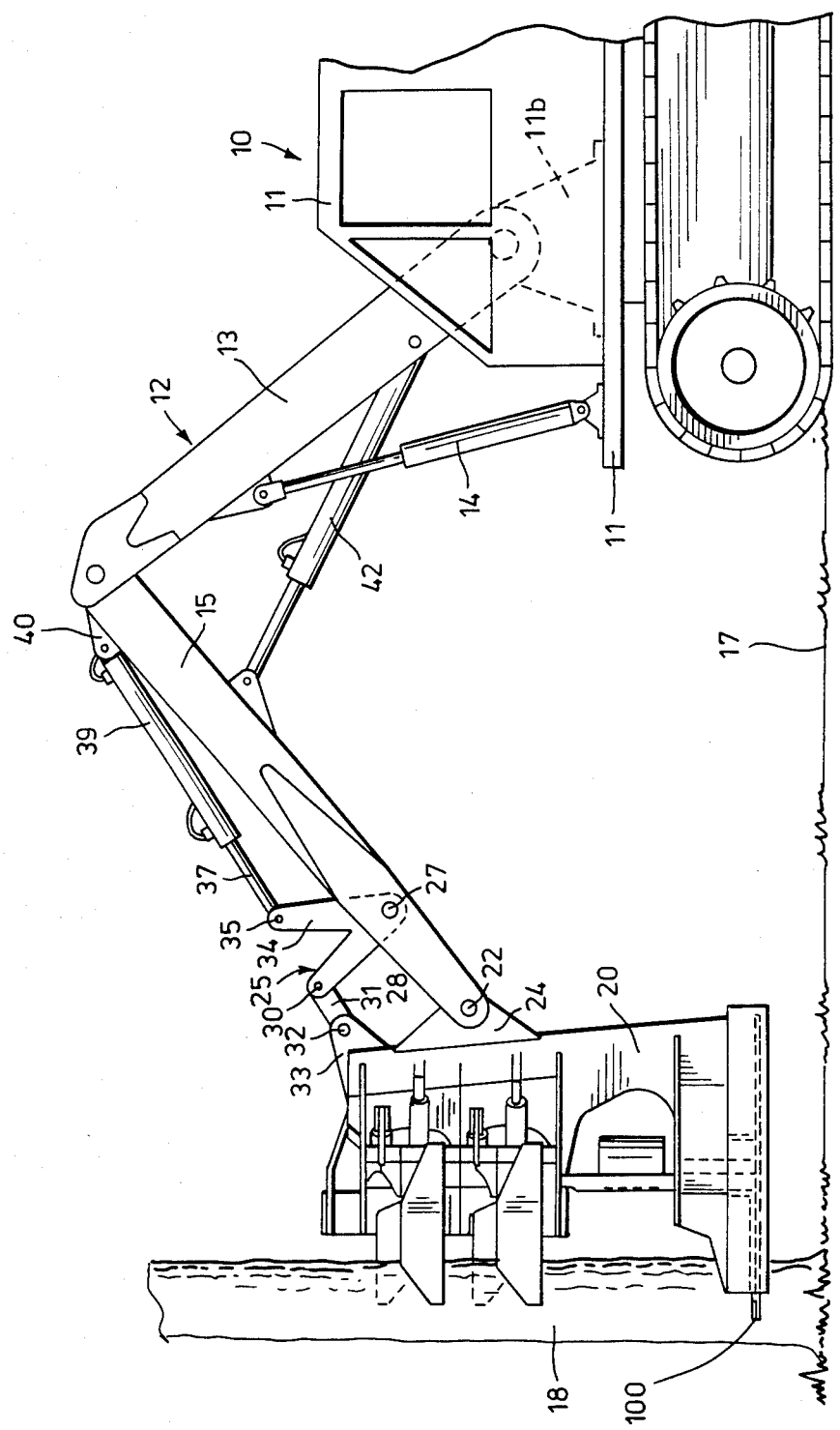
FIG. 1 is an elevational view of a boom on which a felling head according to this invention is mounted.

Attention is first directed to FIG. 1, in which a track vehicle generally shown at the numeral 10 includes a rotatable platform 11 and cab 11a. A bracket 11b supports a boom 12 including a first arm portion 13 which is moved in a vertical plane by twin cylinders 14 (only one visible in FIG. 1), and a second arm portion 15. The track vehicle 10 is travelling on the ground surface 17, from which is growing a tree 18. The vehicle 10 may also be wheeled.

A felling head 20 is mounted at the forward end of the arm portion 15 of the boom 12, specifically at a pivot location 22, by means of a bracket 24. The pivot location 22 allows the felling head 20 to be swivelled in a vertical plane about the pivot location 22. To accomplish the swivelling motion of the felling head 20, a crank arm 25 is provided, pivoted at the location 27 to the arm portion 15 of the boom 12. The crank arm 25 has a first portion 28 pivoted at 30 to a link member 31, which in turn is pivoted at its other end to a pivot location 32 on a bracket 33 attached to the felling head 20 above the pivot location 22. The other portion 34 of the crank arm 28 is pivoted at 35 to the piston 37 of a hydraulic cylinder 39 which is in turn pivoted to a bracket 40 on the arm portion 15. Thus, retraction of the piston 37 by the hydraulic cylinder 39 rocks the crank arm 25 in the clockwise sense as seen in FIG. 1, thereby rocking the felling head 20 in the same sense.

A hydraulic piston 42 controls the angle between the arm portions 14 and 15 of the boom 12.

Figure 2:
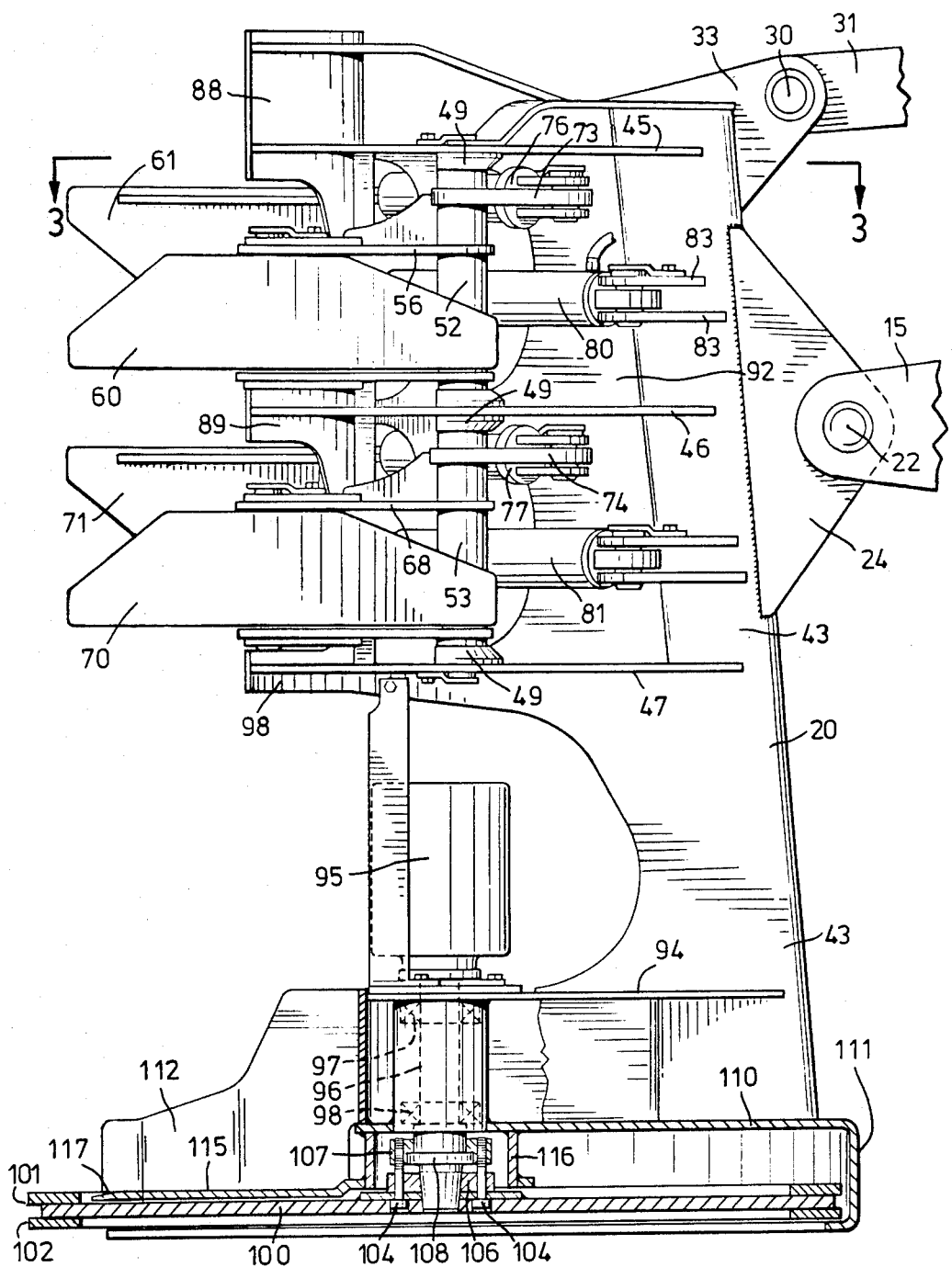
FIG. 2 is a larger scale view of the felling head of this invention.
Figure 3:
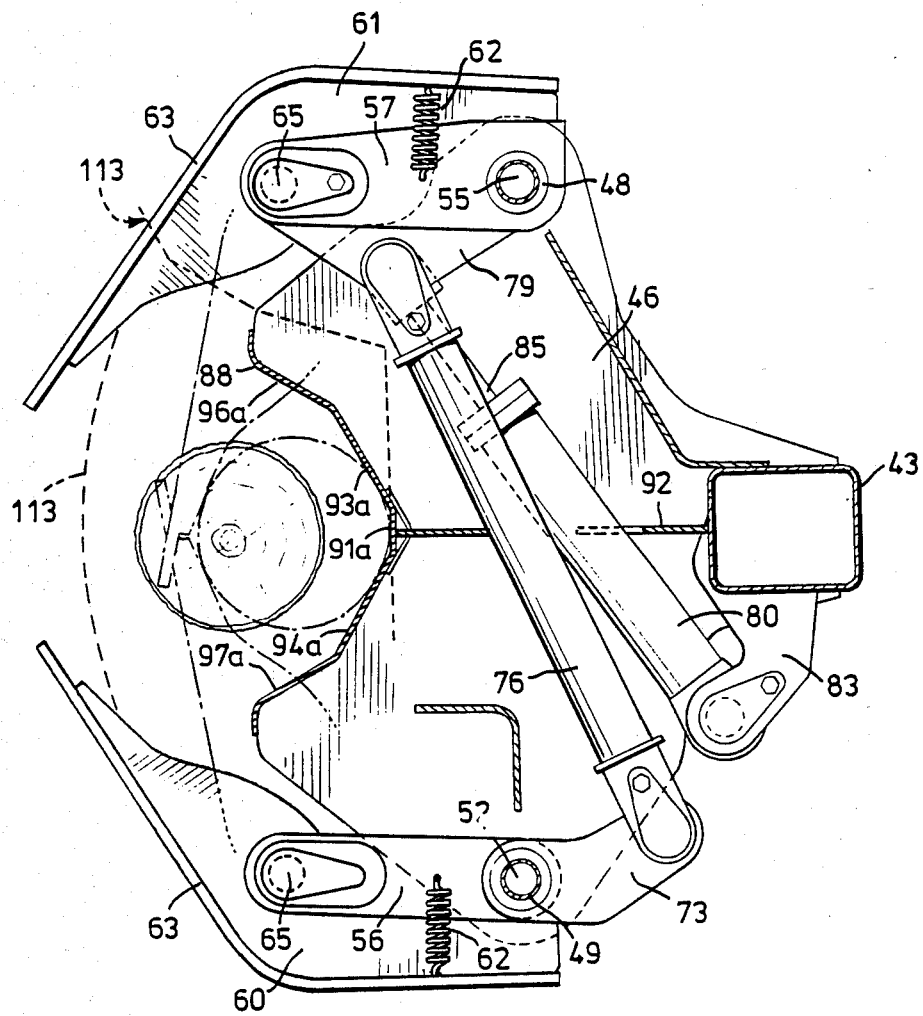
FIG. 3 is a sectional view of the felling head of of FIG. 2, taken at the line 3—3 in FIG. 2.

Attention is now directed to FIGS. 2 and 3, for a more detailed description of the felling head itself.

The felling head 20 has an upright tubular member 43 acting as a main brace for the entire head. The brackets 24 and 33 are secured as by welding or the like to the brace 43.

Secured to the member 43 and extending in horizontal planes are a plurality of plate members 45, 46 and 47. Because of the position of the section line 3—3 in FIG. 2, only the plate member 46 is seen in FIG. 3.

The plate members support a first set of bearings 48 and a second set of bearings 49. Between the upper two bearings 49 is journaled a shaft 52, while between the lower two bearings 49 is journaled a shaft 53. The shafts 52 and 53 turn independently of each other.

Between the upper two bearings 48 is journaled a shaft 55 (see in cross section in FIG. 3) and between the lower two bearings 48 is journaled a shaft which is not seen in either figure, but which corresponds to the shaft 53. The two shafts journaled in the bearings 48 turn independently of each other.

Attached to the upper two shafts 52 and 55 are two arm members 56 and 57, respectively, and pivotally mounted on the arm members 56 are tong members 60 and 61, respectively. Each tong member defines an obtuse angle and has a protective plate 63. As can be seen in FIG. 3, the protective plates 63 overlap the pivot locations between each member 60, 61 and each arm 56, 57 (identified by the numeral 65). Each of the members 60 and 61 is freely swingable about its respective arm member 56 and 57, but is biased to the 'open' position by a spring 62.

A further pair of arm members 68 and 69 (not visible in the figures) is mounted on the lower two shafts, and again two freely swinging members 70 and 71 are pivoted to the lower arm members 68, 69.

The construction of the lower pair of arms is identical to the upper pair of arms already described.

Extending rearwardly from the shafts 52 and 53 are brackets 73 and 74 to which the ends of two connecting links 76 and 77 are pivotally connected. The eyes of the two links 76 and 77 are attached to two brackets, of which one is seen in FIG. 3 at the numeral 79, the two brackets being fixed with respect to the two shafts of which the upper has the number 55.

It will thus be apparent that, whenever the arm member 57 rotates in a counter-clockwise direction as seen in FIG. 3, the connecting link 76 will move downwardly to the right, thus causing the bracket 73 and the arm 56 to pivot in the clockwise direction. This will bring the pair of grapple arms 60 and 61 together. Likewise, the two arms would separate from each other at the same time due to the action of the connecting link 76. The same is true of the lower pair of grapple arms due to the effect of the connecting link 77.

In order to positively move each pair of grapple arms, two hydraulic cylinders 80 and 81 are provided. The upper hydraulic cylinder 80 is visible in FIG. 3, and it can be seen that the same is pivotally connected to a bracket arrangement 83 extending from the upright tubular member 43, and that the piston 85 extending from the cylinder 80 is pivotally connected to the bracket 79 at substantially the same pivot locations as the upper end of the connecting link 76 as seen in FIG. 3.

Thus, when the piston 85 is withdrawn into the cylinder 80, the corresponding upper pair of grapple arms come together, whereas when the piston 85 is extended outwardly from the cylinder 80, the grapple arms 60 and 61 move apart.

The precise same arrangement and function takes place with the lower grapple arms 70 and 71, upon activation of the hydraulic cylinder 81.

The plate members 45, 46 and 47 also support several brace portions 88, 89 and 90, which are substantially V-shaped in form, as seen in FIG. 3, and which more particularly include an inner wall 91a, two gently sloping walls 93a and 94a, and two more steeply sloping walls 96a and 97a.

A vertical plate member 92 extends forwardly from the centre line of the member 43, supports the plate members 45, 46 and 47, and also provides support for the brace portions 88, 89 and 90.

Toward the bottom of the felling head 20 the plate member 92 along with the member 43 is connected to a horizontal plate support 94 to which is bolted a hydraulic motor 95 having a vertical, downwardly extending shaft. The shaft is shown in broken lines at 96, is journaled in two bearings 97 and 98, and supports a circular cutting saw 100 having two sets of cutting teeth 101 and 102 which are displaced above and below the main plate of the circular cutting saw 100. The circular cutting saw 100 is mounted by virtue of a plurality of threaded fasteners such as bolts 104 passing through a hub structure 106 and into a fastening ring 107 which is lodged above an annular ledge 108 on the shaft 96.

A housing for the rearward or rightward portion of the circular cutting saw 100 is defined between a top plate 110, and a rearward plate 111. The housing is open below, so that the bottom of the circular saw 100 is exposed.

The forward edge of the circular saw 100 is shown on FIG. 3 by the broken line 113, and the outline of the profile of a plate 112 (FIG. 2) which defines a pocket to receive the lower end of the cut tree stem is shown at 114 in FIG. 3.

Supported above the circular saw 100 is a fixed plate 115, which is welded to a short cylinder 116 in turn welded underneath the plate 110. The fixed plate 115 is thin enough and mounted low enough that it can be accommodated in the kerf excess over the saw blade thickness. The fixed blade 115 also has a tapered forward or leftward edge 117, which helps it to slide into the kerf under the stem of the tree which is being cut by the circular saw 100 and achieve a guiding action for the head. This means that the saw does not ride against the tree while turning, thus reducing the horsepower necessary to cut through the tree. It should be noted that the plate 115 is not considered essential in order to "support the tree". This arises due to a combination of factors. Firstly, the dynamics of standing trees are such that the trees begin to fall very slowing after they are cut. Secondly, a relatively small uncut portion of the trunk will continue to hold the kerf open. Thirdly, if the cutting head is moved at a relatively high speed (1 to 2 ft/sec) through the tree and the clamps are brought into operation relatively quickly thereafter, the combination of all of these factors will result in the stem of the tree being held away from the saw, whether or not the plate 115 is present.

In operation, referring to FIG. 1, the felling head 20 will be moved toward the tree 18 with the circular saw 100 substantially horizontal, and with both pair of grapple arms wide open. Thus, the first contact of the felling head 20 with the tree 100 will be at the moving saw edge. Nothing else will contact the tree until the saw has cut completely through the tree (aside from the fixed plate 115), and thus no bending moments will be applied to the tree, thereby removing the risk of splintering of the tree adjacent the cut. The felling head 20 can be moved toward the tree either by boom movement (to the side or to the front of the vehicle 10), or by having the boom in a fixed position and the vehicle 10 moving forwardly.

As soon as the circular saw 100 has cut all the way through the tree 18, the cut portion will briefly teeter before starting to fall. However, immediately after the cut has terminated, the stem part of the tree will be close enough to the brace portions 88, 89 and 90 to allow the pairs of grapple arms to close on the tree and bring it in to hold it tightly against the brace portions. Since the lower part of the cut portion of the tree (that just above the cut) will also be held in a V-shaped receptacle defined above the fixed plate 115 and having roughly the same shape as the brace portions 88, 89 and 90, the cut part of the tree will be securely held by the felling head 20.

If it is desired to cut through and accumulate a number of smaller-diameter trees in the felling head 20 before they are deposited all together in a pile or on a transportation vehicle, the pairs of grapple arms can be used independently. Because of the sprung swivelling mounting of the portions 60 and 61 of the upper pair of grapple arms, and of the corresponding portions for the lower pair, it is possible to proceed in the following manner: a first tree is cut and clasped against the brace portions 88, 89 and 90 by the upper pair of grapple arms (let us assume). The lower pair of grapple arms remains open during this first step. Then, a second tree is cut through and the lower pair of grapple arms clasps this second tree as possible to the brace portions 88, 89 and 90. However, because of the presence of the first tree, and the fact that the upper pair of grapple arms is holding the first tree against the brace portions, the second tree will not touch the brace portions. At this point in time, the upper pair of grapple arms can be activated for withdrawal or opening, and because of the swivel mounting just mentioned, the portions 60 and 61 will simply be withdrawn directly out between the two trees, and as the arm members 56 and 57 open away from each other. The lower pair of grapple arms will then be adjusted so that both trees are securely held against the brace portions. This procedure can continue until the V-shaped cavity defined by the brace portions is filled with trees.

Figure 4:
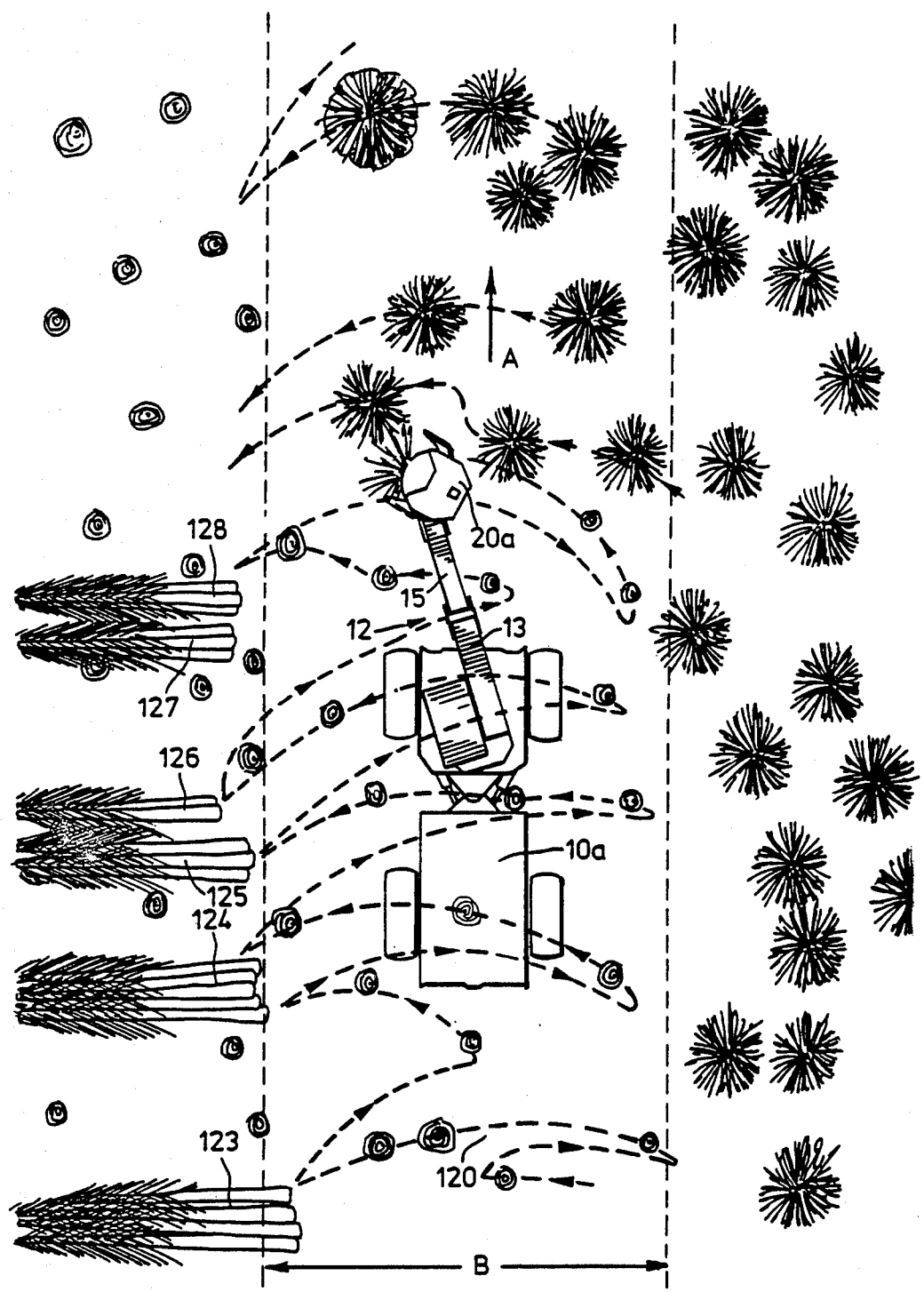
FIG. 4 is a plan view of a vehicle equipped with a felling head according to this invention, showing how it may be used to fell sequential trees growing in a relatively wide swath width.

Attention is now directed to FIG. 4, which shows a vehicle 10a, seen from above, moving at low speed in the direction of the arrow A. FIG. 4 includes a variation from what is shown in FIG. 1, namely that the felling head 20a is angled at 45° to the boom. This facilitates the choice of cutting a tree with swing only, booming only, driving only or some combination of these motions. It also improves the visibility from the operator to the tree being taken, and still permits discharging collected trees with a forward tilt of the head.

In FIG. 4, trees are being cut within a relatively wide swath identified by the width arrow B, which may be in the neighbourhood of 40 feet. The broken line 120 shows a typical swing movement of the felling head 20a as it moves from one tree to another. The movement along the broken line 120 can be a combination of boom swinging, booming or vehicle driving, as the operator chooses. The tree piles 123-128 represent sequential points along the path at which the operator has deposited a plurality of trees collected since the last batch of trees were set down.

I claim:

1. A method of felling trees, comprising the steps:
providing a felling head on a boom, the felling head including an upper part and a lower part, the upper part including at least one brace portion adapted to contact a tree being felled, along with tree grappling means adapted to clasp a tree trunk against said brace portion, the lower part having a circular saw blade mounted thereon in a plane perpendicular to the longitudinal extent of a tree clasped between the brace portion and the grappling means, the circular saw blade having its leading edge projecting beyond the location of the brace portion by a distance such that a typical tree being felled can be cut through by the saw blade before the tree comes into contact with any other part of the felling head, including the brace portion,
cutting through a tree with the circular saw of the felling head oriented in a plane substantially perpendicular to the axis of the tree, and
after the tree has been completely cut through but before the part of the tree above the cut has been significantly displaced in translation or angulation from its position prior to the cut, clasping the tree above the cut between the said brace portion and the said tree grappling means.

2. A felling head for attachment to a boom, felling head comprising:
an upper part and a lower part,
the upper part including at least one brace portion adapted to contact a tree being felled, along with tree grappling means adapted to clasp a tree trunk against said brace portion,
the lower part having a circular saw blade mounted thereon in a plane perpendicular to the longitudinal extent of a tree clasped between the brace portion and the grappling means, the axis of the saw blade being fixed with respect to the upper and lower part, the circular saw blade having its leading edge projecting beyond the location of the brace portion by a distance at least as great as the diameter of a tree being felled so that such tree must be cut through by the saw blade before the tree can come into contact with any other part of the felling head, including the brace portion, whereby no undue bending or shear forces are applied to the tree during the cutting of the tree.

3. The felling head claimed in claim 2, in which the tree grappling means includes two brace portions in alignment perpendicular to the plane of the saw blade, and two pairs of arms, one pair for each brace portion, each pair of arms being adapted to move together toward their respective brace portion and apart away from their respective brace portion in a plane substantially parallel to the plane of the saw blade.

4. The felling head claimed in claim 2, in which a stationary plate is provided adjacently above the circular saw blade, the saw blade having peripheral cutting teeth extending beyond the periphery of the stationary plate.

5. The felling head claimed in claim 2, in which said at least one brace portion is substantially V-shaped so as to receive the trunk of the tree being felled.

6. The felling head claimed in claim 3, in which each arm has an inner portion pivoted to the felling head, and an outer portion pivoted to the inner portion and extending to both sides of its pivot location, thereby to allow a first tree to be grasped by one pair of arms, then a second tree to be grasped forward of said one pair of arms by the other pair of arms, then the said one pair of arms to be withdrawn from between the two trees.

7. A method of felling a tree, including the steps:
  (a) cutting through the tree with a circular saw oriented in a plane substantially perpendicular to the axis of the tree, and
  (b) substantially immediately after the tree has been completely cut through, but before the part of the tree above the cut has been significantly displaced in translation or angulation from its position prior to being cut, clasping the tree above the cut by the use of a grapple means adapted to set the tree down in a desired location.

* * * * *